US009625883B2

(12) United States Patent
Romanik et al.

(10) Patent No.: US 9,625,883 B2
(45) Date of Patent: Apr. 18, 2017

(54) SYSTEMS AND METHODS FOR INTERFACING AUTOMATION CONTROL SYSTEMS TO EXTERNAL SYSTEMS

(71) Applicant: General Electric Company, Schenectady, NY (US)

(72) Inventors: Christina Ann Romanik, Roanoke, VA (US); Tomas Christopher Gardiner, Roanoke, VA (US); Patrick Joseph Conroy, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 769 days.

(21) Appl. No.: 13/969,459

(22) Filed: Aug. 16, 2013

(65) Prior Publication Data
US 2015/0051714 A1    Feb. 19, 2015

(51) Int. Cl.
*G05B 11/01* (2006.01)
*H04L 29/08* (2006.01)

(52) U.S. Cl.
CPC ............ *G05B 11/01* (2013.01); *H04L 67/125* (2013.01); *Y02P 90/18* (2015.11); *Y02P 90/185* (2015.11)

(58) Field of Classification Search
CPC ........ G05B 11/01; Y02P 90/185; Y02P 90/18; H04L 67/125
See application file for complete search history.

(56) References Cited

U.S. PATENT DOCUMENTS

| 6,169,928 | B1 | 1/2001 | Olson et al. | |
| 8,155,761 | B2* | 4/2012 | Felts | G05B 19/4186 700/17 |
| 2006/0133412 | A1* | 6/2006 | Callaghan | G06F 9/54 370/465 |

FOREIGN PATENT DOCUMENTS

| EP | 1674995 A2 | 6/2006 |
| EP | 2378716 A2 | 10/2011 |

OTHER PUBLICATIONS

PCT Search Report and Written Opinion issued Feb. 5, 2015 in relation to corresponding PCT application No. PCT/US2014/050610.

* cited by examiner

Primary Examiner — Kim T Nguyen
(74) Attorney, Agent, or Firm — Fletcher Yoder, P.C.

(57) ABSTRACT

A system includes an industrial controller comprising a first processor. The first processor is configured to execute a substantially deterministic control process. The first processor is further configured to communicate with a second processor included in a communications interface system and communicatively coupled to the first processor, wherein the first processor is configured to communicate an asynchronous data to the second processor via an industrial communications protocol during the execution of the control process, and the second processor is configured to retrieve external data from an external system based on the asynchronous signal, and to communicate the external data to the control system via an Ethernet-based communications protocol.

17 Claims, 4 Drawing Sheets

SYSTEMS AND METHODS FOR INTERFACING AUTOMATION CONTROL SYSTEMS TO EXTERNAL SYSTEMS

BACKGROUND OF THE INVENTION

The subject matter disclosed herein relates to systems and methods for providing automation control access to external systems.

Certain systems, such as industrial control systems, may provide for process control of a variety of devices. For example, an industrial control system may include controllers, field devices, and sensors monitoring data to derive subsequent control actions, such as the actuation of the field devices. Furthermore, controllers may provide for the execution of control processes, such as the production of power, chemical processes, manufacturing process, and the like, useful in automating industrial systems. In certain cases, the controller may be communicatively coupled to external systems. It would be beneficial to improve the interfacing of control systems to external systems.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes an industrial controller comprising a first processor. The first processor is configured to execute a substantially deterministic control process. The first processor is further configured to communicate with a second processor included in a communications interface system and communicatively coupled to the first processor, wherein the first processor is configured to communicate an asynchronous data to the second processor via an industrial communications protocol during the execution of the control process, and the second processor is configured to retrieve external data from an external system based on the asynchronous signal, and to communicate the external data to the control system via an Ethernet-based communications protocol.

In a second embodiment, a method includes placing an asynchronous call by using an industrial controller, and translating the asynchronous call into a service oriented architecture (SOA) call. The method further includes placing the SOA call and processing the SOA call by using a SOA interface. The method additionally includes deriving data based on processing the SOA call, and transmitting the data to the industrial controller, wherein the industrial controller is configured to execute a substantially deterministic control process.

In a third embodiment, a non-transitory computer-readable medium includes instructions executable by a processor. The instructions are configured to place an asynchronous call by using an industrial controller and to translate the asynchronous call into a service oriented architecture (SOA) call. The instructions are further configured to place the SOA call and to process the SOA call by using a SOA interface. The instructions are additionally configured to derive data based on processing the SOA call and to transmit the data to the industrial controller, wherein the industrial controller is configured to execute a substantially deterministic control process.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
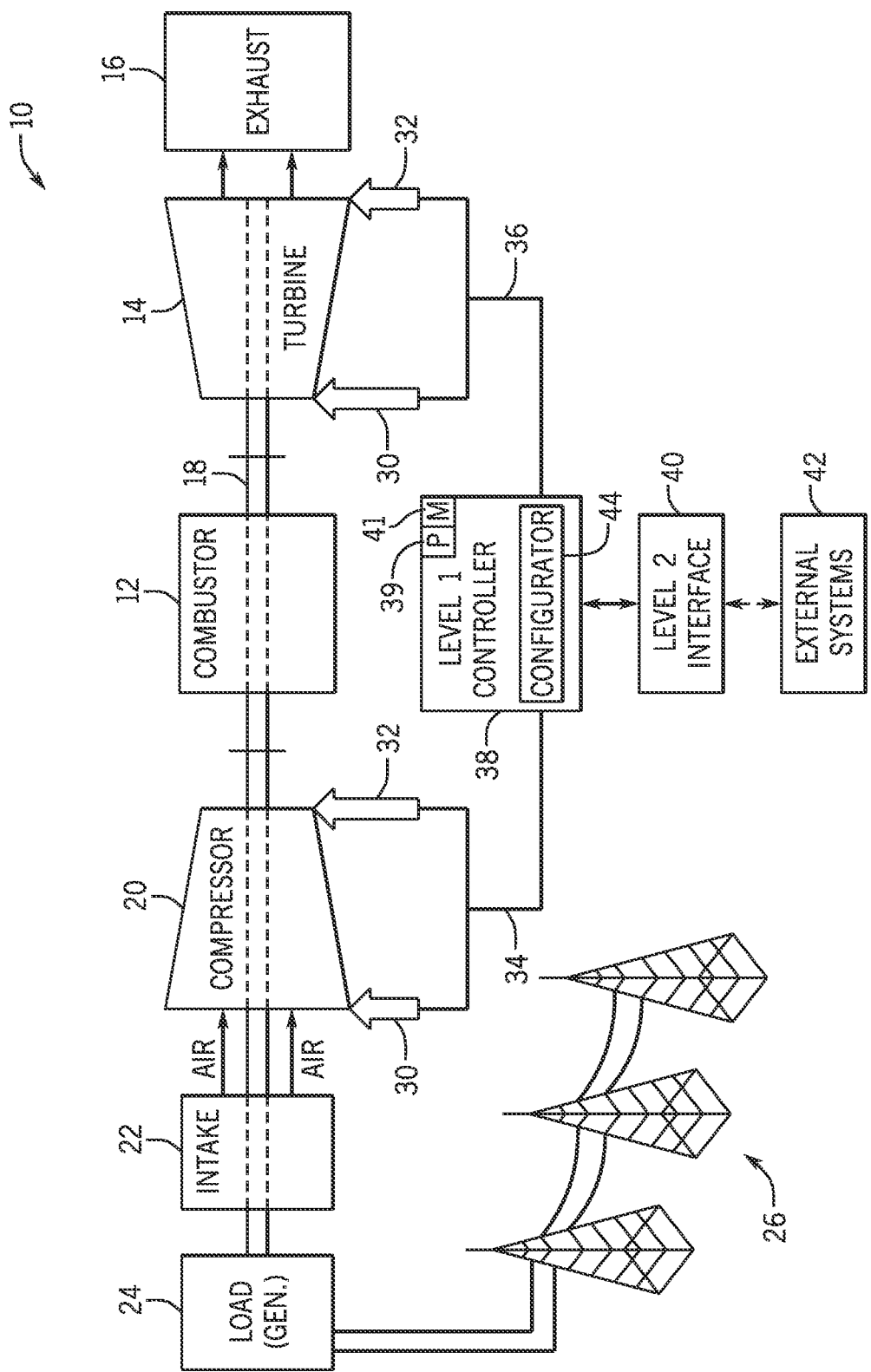
FIG. 1 is a block diagram illustrating an embodiment of an industrial control system, including a controller and a service oriented architecture (SOA) communications interface.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

In certain embodiments described herein, a communications interface may be used to mediate communications between a controller and external systems. In one embodiment, the controller is a Purdue Reference Model (PRM) level 1 controller suitable for executing a substantially deterministic control process, as described in more detail below with respect to FIG. 1. The communications interface may enable, for example, asynchronous communications between the controller and external systems, such as internet based systems. Accordingly, the controller may continue providing substantially deterministic control of a desired industrial facility or system while the communications interface processes data externally from the controller and then returns the data to the controller. The data returned from external systems may include a variety of data, such as weather data, maintenance data, data from related facilities, outage data, controller configuration data, controller reprogramming data, commercial data, and the like, which may then be used by the controller to update the controller and/or execute desired control algorithms.

In certain embodiments, the communications interface may include a service oriented architecture (SOA) communications interface suitable for using a variety of protocols, including loosely coupled protocols such as protocols using web services description language (WSDL), JavaScript object notation (JSON), service registry based protocols, and the like. By using SOA, coupling to a variety of commercial and/or custom SOA-enabled software and hardware systems may be enabled, the allocation of programming resources may be made more efficiently, and costs may be minimized. By utilizing the techniques described herein, the PRM level 1 controller may place service calls, such as generic and/or custom SOA service calls, and process the data returned by the communications interface. Accordingly, the PRM level 1 controller may provide more flexible control of the desired industrial process (e.g., industrial activity and/or set of industrial steps).

With the foregoing in mind, it may be useful to describe an industrial control system, such as a power generation system incorporating the techniques disclosed herein. Accordingly, FIG. 1 illustrates a gas turbine system 10 as an example embodiment of an industrial control system that incorporates the improved control techniques disclosed herein. As depicted, the turbine system 10 may include a combustor 12, which may receive a fuel/air mixture for combustion. This combustion creates hot, pressurized exhaust gases, which the combustor 12 directs through a turbine 14 (e.g., part of a rotor) and toward an exhaust outlet 16. As the exhaust gases pass through the turbine 14, the resulting forces cause the turbine blades to rotate a drive shaft 18 along an axis of the turbine system 10. As illustrated, the drive shaft 18 is connected to various components of the turbine system 10, including a compressor 20.

The drive shaft 18 may include one or more shafts that may be, for example, concentrically aligned. The drive shaft 18 may include a shaft connecting the turbine 14 to the compressor 20 to form a rotor. The compressor 20 may include blades coupled to the drive shaft 18. Thus, rotation of turbine blades in the turbine 14 may cause the shaft connecting the turbine 14 to the compressor 20 to rotate the blades within the compressor 20. The rotation of blades in the compressor 20 compresses air that is received via an air intake 22. The compressed air is fed to the combustor 12 and mixed with fuel to allow for higher efficiency combustion. The shaft 18 may also be connected to a load 24, which may be a vehicle or a stationary load, such as an electrical generator in a power plant or a propeller on an aircraft. When the load 24 is an electrical generator, the electrical generator may be coupled to a power grid 26 for distributing electrical power to, for example, residential and commercial users.

The turbine system 10 may also include a plurality of sensors and field devices configured to monitor a plurality of engine parameters related to the operation and performance of the turbine system 10. The sensors and field devices may include, for example, inlet sensors and field devices 30 and outlet sensors and field devices 32 positioned adjacent to, for example, the inlet and outlet portions of the turbine 14, and the compressor 20, respectively. The inlet sensors and field devices 30 and outlet sensors and field devices 32 may measure, for example, environmental conditions, such as ambient temperature and ambient pressure, as well as a plurality of engine parameters related to the operation and performance of the turbine system 10, such as, exhaust gas temperature, rotor speed, engine temperature, engine pressure, gas temperature, engine fuel flow, exhaust flow, vibration, clearance between rotating and stationary components, compressor discharge pressure, pollution (e.g., nitrogen oxides, sulfur oxides, carbon oxides and/or particulate count), and turbine exhaust pressure. Further, the sensors and field devices 30 and 32 may also measure actuator information such as valve position, and a geometry position of variable geometry components (e.g., air inlet). The plurality of sensors and field devices 30 and 32 may also be configured to monitor engine parameters related to various operational phases of the turbine system 10. Measurements taken by the plurality of sensors and field devices 30 and 32 (e.g., operational parameters of the industrial automation system 10) may be transmitted via module lines 34 and 36, which may be communicatively coupled to a PRM level 1 controller 38. The PRM level 1 controller may include at least one processor 39 suitable for the execution of computer instructions, and a memory 41 suitable for storing computer instructions and other data. In another embodiment, the controller 38 may be a Triple Modular Redundancy (TMR) controller having three processors or cores performing a single task with the output determined by a voting of the three systems.

PRM level 1 controllers may be directly controlling industrial processes, as compared to level 2 systems that may provide for supervisory control (e.g., distributed control systems [DCS], manufacturing execution system [MES], and so on). Accordingly, the controller 38 may be directly connected to the sensors 30 and field devices 32 by using wired conduits. The controller 38 may then provide for a substantially deterministic control of the system 10 without adding another control layer. For example, in the depicted example, module line 34 may be utilized to transmit measurements from the compressor 20, while module line 36 may be utilized to transmit measurements from the turbine 14. The controller 38 may use the measurements to actively control the turbine system 10.

It should be appreciated that other sensors may be used, including combustor 12 sensors, exhaust 16 sensors, intake 22 sensors, and load 24 sensors. Likewise, any type of field devices 30 may be used, including "smart" field devices such as Fieldbus Foundation, Profibus, and/or Hart field devices. It is also to be appreciated that the gas turbine system 10 is only an example embodiment of an industrial control system, and that other industrial automation systems may include, for example, automated power generation systems, such as gas turbines, steam turbines, wind turbines, or hydro turbines, heat recovery steam generators (HRSG), a power generator, fuel skids, gas processing systems, or any other automated power generation system or partially-automated power generation system. Other industrial automation systems may include automated manufacturing systems such as chemical plants, pharmaceutical plants, oil refineries, automated production lines or similar automated or partially-automated manufacturing system.

Also depicted is a communications interface system 40, which may be communicatively coupled to the controller 38, for example, by using an Ethernet cable 41 (e.g., RJ45 cable). In other embodiments, other communication conduits or cables may be used, such as serial cables (e.g., DB9), wireless conduits, and so on. In the depicted embodiment, the communications interface system 40 may include a PRM level 2 and above (e.g., level 3, 4, 5) functionality. That is, the interface 40 may include supervisory functionality as provided by the PRM reference for level 2 systems, and may additionally be included in other systems, such as a DCS, MES, human machine interface (HMI), and so on.

The communications interface system 40 may be communicatively coupled to the PRM level 1 controller 38 and used to receive, for example, asynchronous SOA service requests from the controller 38. The service requests may be further processed by the communications interface system 40, and external systems 42 may be used to provide data related to the service requests. The external systems may include other control systems 10, weather systems, business logic systems, maintenance systems (e.g., maintenance log systems, maintenance scheduling systems), and so on. The data from the external systems may then be received by the communications interface system 40, further processed and/or translated, and delivered to the controller 38. In one embodiment, the data may include controller configuration be provided to a configurator system 44. The configurator system 44 may then reconfigure the controller and/or reprogram the controller. For example, the configurator system 44 may set any number of controller parameters (e.g., input/output [I/O] configuration, memory configuration, networking configuration, and so on). For example, I/O pack configuration information, memory paging, memory size, virtual memory, network packet size, latency, and so on, may be set.

In one embodiment, the data may be communicated from and to the controller by using an Ethernet Global Data (EGD) automation protocol. The EGD automation protocol may include an "exchange" data structure that uses shared memory techniques to more efficiently and securely exchange data, as described in more detail below with respect to FIG. 2. By enabling service calls, including SOA service calls, to the PRM level 1 controller, the techniques described herein may enable a more flexible control process, such as providing for the use of weather data business data, maintenance data, logistics data (e.g., parts procurement data) for the system 10.

Figure 2:
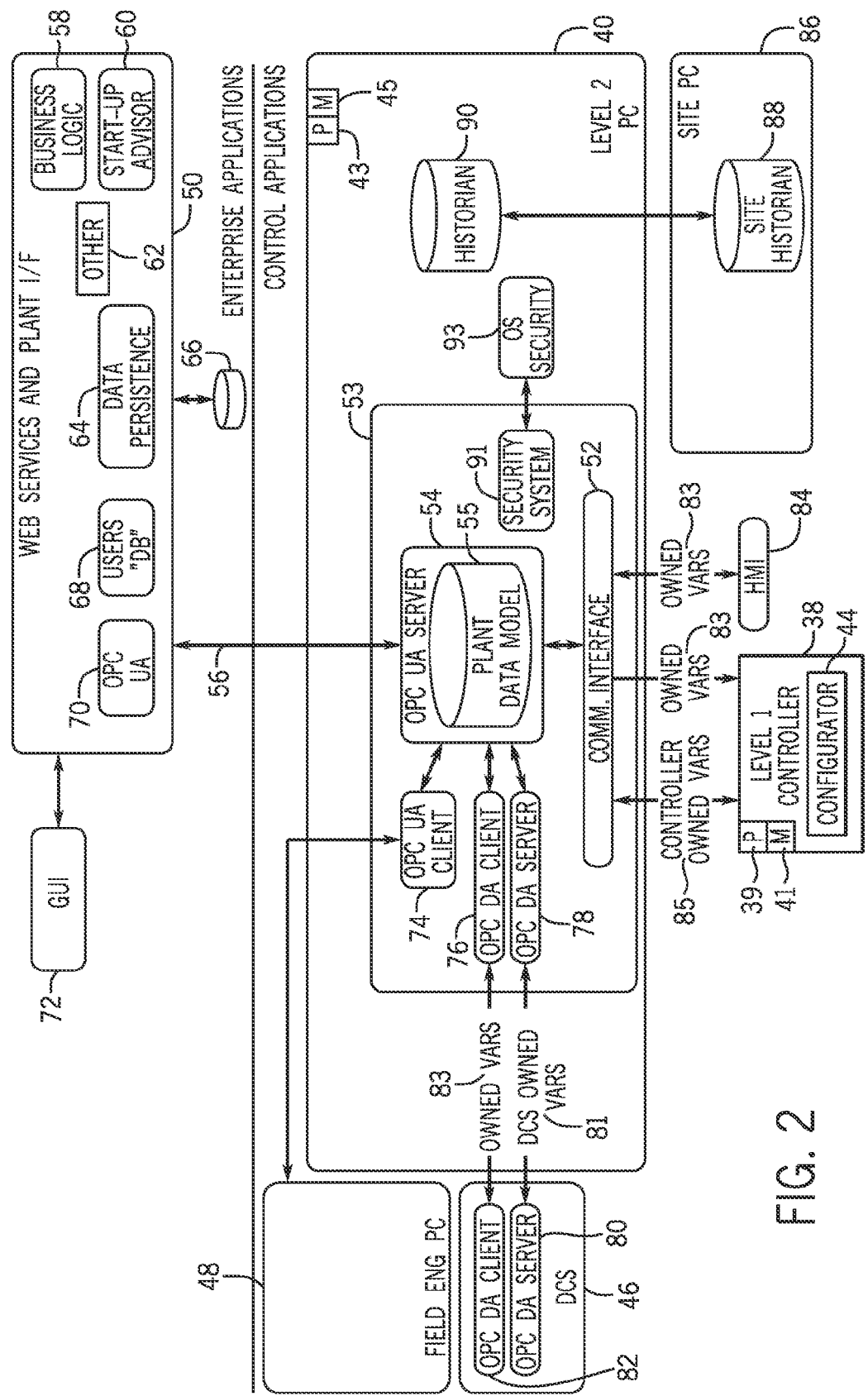
FIG. 2 is a block diagram depicting additional details of an embodiment of the controller and the SOA communications interface of FIG. 1.

FIG. 2 is a block diagram of the level 1 controller 38 of FIG. 1 communicatively coupled to the communications interface system 40 and to external systems 42, such as a distributed control system (DCS) 46, a field engineer personal computer 48, and a web services and plant information system 50. The communications interface system 40 may include a workstation, a server, a laptop, a tablet, a cell phone, a mobile device, or any computing device. Accordingly, the communications interface system 40 may include a processor 43 suitable for executing computer instructions, such as instructions stored in a memory 45. As mentioned above, the level 1 controller 38 may use the EGD automation protocol to communicate with or through the communications interface system 40. Accordingly, the communications interface system 40 may include a controller communications interface 52 providing for communication functionality (e.g., SOA communications interface functionality, including EGD, Modbus, and any other data translation services) useful in communicating data between the communications interface system 40 and the level 1 controller 38. In the depicted embodiment, the controller communications interface 52 is hosted in a human machine interface (HMI) 53, such as WorkstationST™ available from General Electric Company, of Schenectady, N.Y. It is to be understood that, in other embodiments, the controller communications interface 52 may be provided as a component of a distributed control system (DCS), a supervisory control and data acquisition (SCADA), a manufacturing execution system (MES), and/or as a standalone system.

The communications interface system 40 also includes an Open Connectivity via open standards (OPC) Unified Architecture (UA) server 54 communicatively coupled to the controller communications interface 52 and suitable for using OPC communications protocols (e.g., opc.tcp//Server, http://Server) to exchange data with the controller communications interface 52. By using the OPC communications protocols, the techniques described herein enable the level 1 controller 38 to further communicate with a variety of other systems. Indeed, the level 1 controller 38 may communicate using a high reliability, deterministic communications protocol, such as EGD, Modbus, or a combination thereof, and the communication may be translated to a service-oriented communications protocol, such as the OPC communications protocol, for use with external systems. Accordingly, controller owned variables 85 may be communicated. The OPC UA server 54 may include a plant data model 55 useful in modeling relationships (e.g., Entity Relationship [ER] modeling), systems, application programming interfaces (API), and the like, related to the system 10.

In one embodiment, data, such as a service request being transmitted by the level 1 controller 38, may be processed by using asynchronous EGD exchange data structure in the controller communications interface 52 and then translated into data requests suitable for processing by the OPC UA server 54. The EGD exchange data structure may include, for example, a "produced exchange" EGD data structure, a "consumed exchange" EGD data structure, or a combination thereof, which may use unicast and/or multicast techniques for communication of the service request. The OPC UA server 54 may then request data, for example, by using a conduit 56 (e.g., SOA conduit) from the web services and plant information system 50. The web services and plant information system 50 may then further process the data, for example, by using a business logic system 58, a start-up advisor system 60, and other systems 62.

The business logic system 58 may include, for example, business logic useful in operating the industrial system 10, and/or the level 1 controller 38. For example, the business logic system 58 may include logic or rules useful in the determining the current price of power produced, the future price of power produced (e.g., energy futures), green credits, as well as certain regulatory constraints. For example, the regulatory constraints may include the cost of producing certain undesired particulate, such as nitrogen oxides (NOx), carbon dioxide emissions, and so on. Additionally, or alternatively, the business logic system 58 may include business logic related to the operation of other systems 10. For example, the business logic system 58 may be communicatively coupled to other systems such as other systems 10, and may include information such as outage of other systems 10, maintenance schedules of other systems 10, off lining of other systems 10, and other related information. The startup advisor system 60 may include, for example, information related to startup operations of the system 10. Such information may include desired start up schedules, desired startup power curves, and desired type of fuel to use during startup (e.g., diesel, natural gas, syngas), and so on.

The other systems 62 may include, but are not limited to, weather systems, such as national oceanic and atmospheric administration (NOAA) databases, commercial weather databases, business logic systems, maintenance systems (e.g., maintenance log systems, maintenance scheduling systems), and so on. Accordingly, data, such as service request received from the level 1 controller 38 by using the communications interface system 40, may be transformed by the systems 58, 60, and 62 of the web services and plant information systems 50 into data provided via the conduit 56 into the level 1 controller 38 useful in operations of the controller 38.

In the depicted embodiment, a data persistence system 64 of the web services and plant information system 50 may additionally include a user database 68 and an OPC UA client 70. The user database 68 may include a data repository of users authorized to access or otherwise communicate with the web services and plant information system 50. The users may include human entities as well as or alternatively to software and hardware entities. The OPC UA client 70 may be a client system suitable for communicating with the OPC UA server 54 by using the OPC communications protocol. Additionally or alternatively, a graphical user interface (GUI), is also communicatively interfaced to the web services and plant information system 50. Accordingly, the GUI 72 may be used to provide a direct interface such as a web interface into the web services and plant information system 50.

By using a SOA architecture, the techniques described herein may enable the level one controller 38 to communicate with a variety of systems by using the communication interface system 40. For example, the field engineering personal computer 48, and the DCS 46 may use the OPC communications protocol to communicatively interface to the level one controller 38 through the communications interface system 40. For example, the field engineer personal computer 48 may be used to reconfigure and/or to reprogram the level one controller 38 through the communications interface system 40. Accordingly, configuration information including but not limited to certain controller properties, may be transmitted from the field engineer personal computer 48 to the level one controller 38 via the communications interface system 40, and new or updated programming instructions may be similarly transmitted. Likewise, the DCS 46 may use the communications interface system 40 to transmit and/or receive information related to the level one controller 38. Such information may include information useful in the distributed control of the system 10 as well as information useful in synchronizing the level one controller 38, for example, with other systems.

To provide communicative interfaces to the field engineering personal computer 48 and/or the DCS 46, the communications interface system 40 may include an OPC UA client 74, OPC DA server 76 and/or an OPC DA client 78. For variables that are owned by the DCS 46, the OC DA client 78 may be communicatively coupled to an OPC DA server 80. For other variables, including variables associated with the level one controller 38, the OPC DA server 76 may be communicatively coupled to an OPC DA client 82 also included in the DCS 46. By using the OPC DA server 80 for DCS owned variables (vars) 81, and the OPC DA client 82 for other variables 83 owned by the system 40, the techniques described herein, may enable a more efficient communications. For example, suitable publish and subscribe mechanisms may be set at the server 76 and server 80, in order to publish and subscribe to specific DCS variables and other variables. Accordingly, multiple data paths, a data path associated with DCS variables and a data path associated with other variables may be used to communicate with the communications interface system 40 and the level one controller 38.

Also depicted are a human machine interface (HMI) and a site computing device 86, communicatively coupled to the communications interface system 40. The HMI 84 may include a graphical user interface suitable for visually interacting with the communications interface system 40, for example, by using a plurality of the sight computing device 86 may include a site historian data repository 88 useful in collecting a variety of data from a historian data base 90 included in the communications interface system 40. The site historian data base 88 may, in one embodiment, be used as a logging data base useful in logging a variety of information from the communication interface system 40, including information related to the level one controller 38 such as, logs of the EGD communications between the level one controller 38 and a communications interface system 40. By using the techniques described herein, the level one controller 38 may issue certain service calls, such as service calls described in more detail below with respect to FIG. 3, and process data resulting from these service calls. A security system 91 may also interface with an operating system (OS) security system 93 to provide, for example, secure authentication, authorization, security logging (accounting) secure communications (e.g., secure socket layers, virtual private networks), management of security certificates, and the like.

Figure 3:
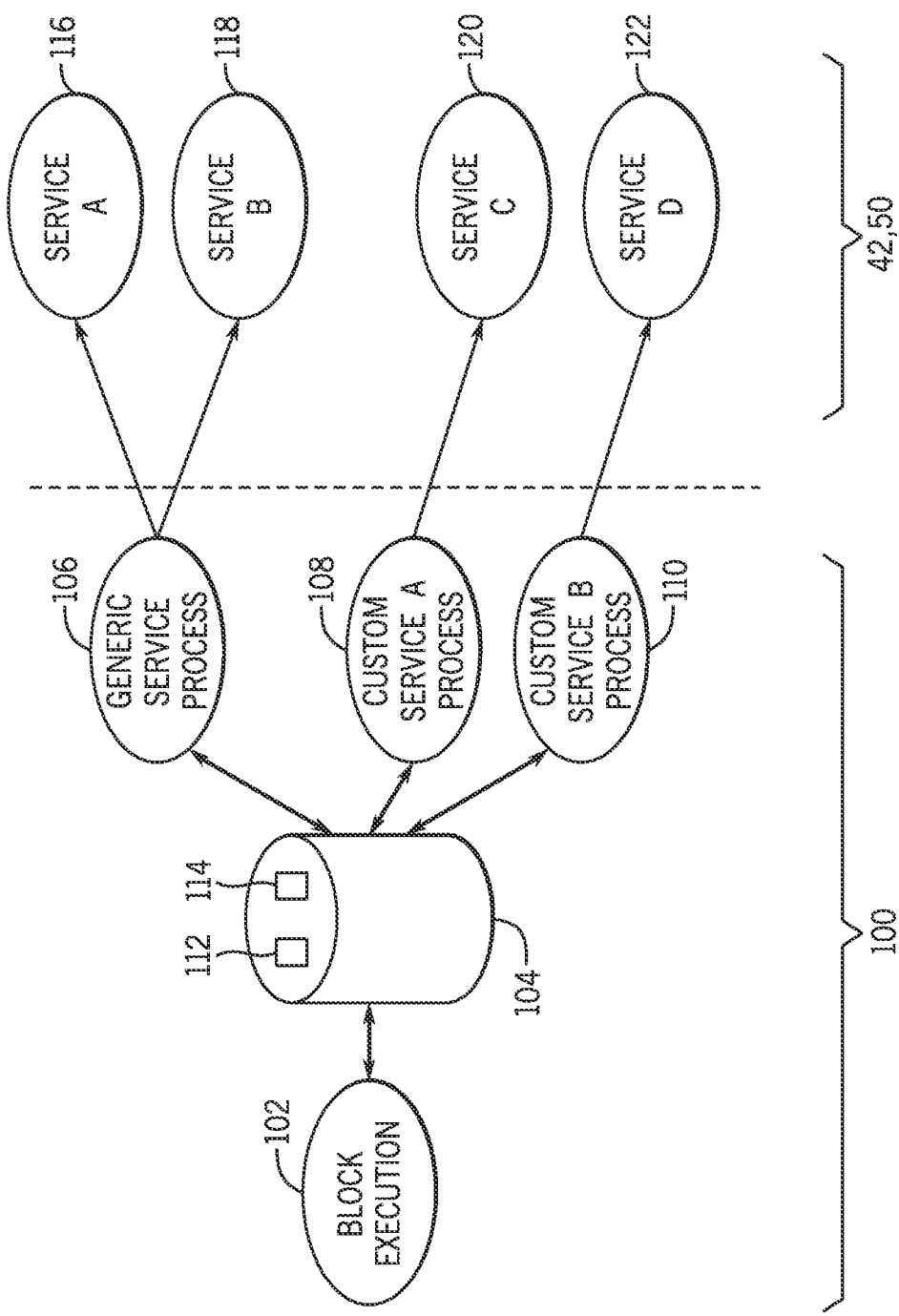
FIG. 3 is an information flow diagram depicting an embodiment of a blockware engine suitable for communications between the controller of FIG. 1 and a desired external system.

FIG. 3 is a information flow diagram depicting an embodiment of a blockware engine 100 having a block execution process 102, an interprocess communications (IPC) system 104, and service processes 106, 108, and 110. The service processes 106, 108, 110 may be implemented as a computing process or instance, and my include one or more execution threads. In another embodiment, the one or more of the processes 106, 108, 110 may each be replaced with a single thread of execution (e.g., computing thread). The blockware engine 100 may be implemented via computer executable instructions stored, for example, in the memory 41 and executed by the processor 39. In the depicted embodiment, the blockware engine 100 may execute function block code, such as function blocks that adhere to the international electrotechnical commission (IEC) 61131-3 standard for function block programs. More specifically, execution of function block programs (e.g., blockware) may be provided by using the block execution process 102. As mentioned above, the blockware engine 100 may provide for code execution compliant with PRM level 1 controller guidelines, thus enabling substantially deterministic execution of the blockware. Additionally or alternatively, the engine 100 may include an execution engine suitable for executing a sequential function chart (SFC) program, an instruction list program, and the like.

As depicted, the block execution process 102 may be communicatively coupled to the IPC system 104, which may use shared memory to communicate between the block execution process 102 and the processes 106, 108, and 110. For example, a "produced exchange" EGD data structure 112, a "consumed exchange" EGD data structure 114, or a combination thereof, may be used to communicate between the block execution engine 102 and the processes 106, 108, 110. The EGD protocol may enable a producer (e.g., server process, such as process 102 and/or 106, 108, 110) to share a portion of its memory to all the consumers (e.g., client processes, such as processes 106, 108, 110 and/or 102) at a scheduled periodic rate. The protocol may use UDP over Ethernet for exchanging data. A snapshot of internal reference memory, mediated by an Ethernet interface, is referred to as an exchange. An exchange does not require a reply and is identified by a unique combination of three major identifiers, such as a producer ID (e.g., producer's IP address), an exchange ID (e.g., client's IP address), and an adapter name (e.g., Ethernet interface identifier).

The blockware engine 100 enables the creation of control code using a familiar function block diagram environment and at the same time provides high real-time determinism. Before the techniques described herein, constraints of existing blockware functionality provided by controllers included limitations in accessing data that is communicated as I/O either from I/O packs (e.g., hardware I/O cards attached to a bus and communicatively coupled to the controller 38) or through a network protocol (e.g., Modbus). The techniques described herein provide for extending the controller 38 runtime to communicate with data structure via web services that are exported by the external systems 42 and/or 50.

From the perspective of the blockware engine 100, web services 116, 118, 120, 122 implemented by the external systems 42, 50 may be grouped into two classes. A first class may include generic or simple services 116, 118. These services 116, 118 are semantically and syntactically straightforward, e.g. simple standalone methods that may take a fixed number of inputs that are primitive types and return a fixed number of primitive types (e.g., integer, string, float, matrix, and so on). No assumption is made as to whether the service is statefull or not.

Custom or complex services that do not meet the definition of simple services include services 120, 122. These services 120, 122 might, for example, return arrays of data or other complex structures (e.g., classes, structs) that may not be readily translatable into the primitive data types that exist in the blockware engine 100. An implication of this distinction between simple and complex services is that there may be certain services that can be discovered at configuration time by having access to the WSDL (Web Services Description Language) file for the service (e.g., services 116, 118, 120, 122) and can be handled by a generic local I/O process in the blockware engine 100 (e.g., process 106, 108, 110) that may be configured, for example, by certain pcode records (e.g., firmware). The converse of this implication is that some web services (e.g., 120, 122) may each use a custom process (e.g., processes 108, 110) for the custom web service, together with a custom definition for the service to be used by the HMI 53 while configuring the service. That is, generic services may all use the process 106 while custom services may each use a custom process, such as the processes 108 and 110.

The functions and/or methods of services 116, 118 may be exposed directly to the blockware through a set of inputs and output variables. The methods of complex services 120, 122 may need to be normalized to the data types that the blockware (e.g., function blocks) are designed to use. It is expected that the inputs to the processes 106, 108, 110 can include string data types that may be present in the downloaded pcode files as constants. It is expected that, if needed, the local I/O process 108, 110 for complex services 120, 122 could make multiple service calls to the service while servicing a single 'call' from the blockware. By providing for techniques useful in enabling the controller 38 (e.g., PRM level 1 controller) from interfacing with external systems 42, 50, the techniques described herein may enable more flexible and extensible control systems.

Figure 4:
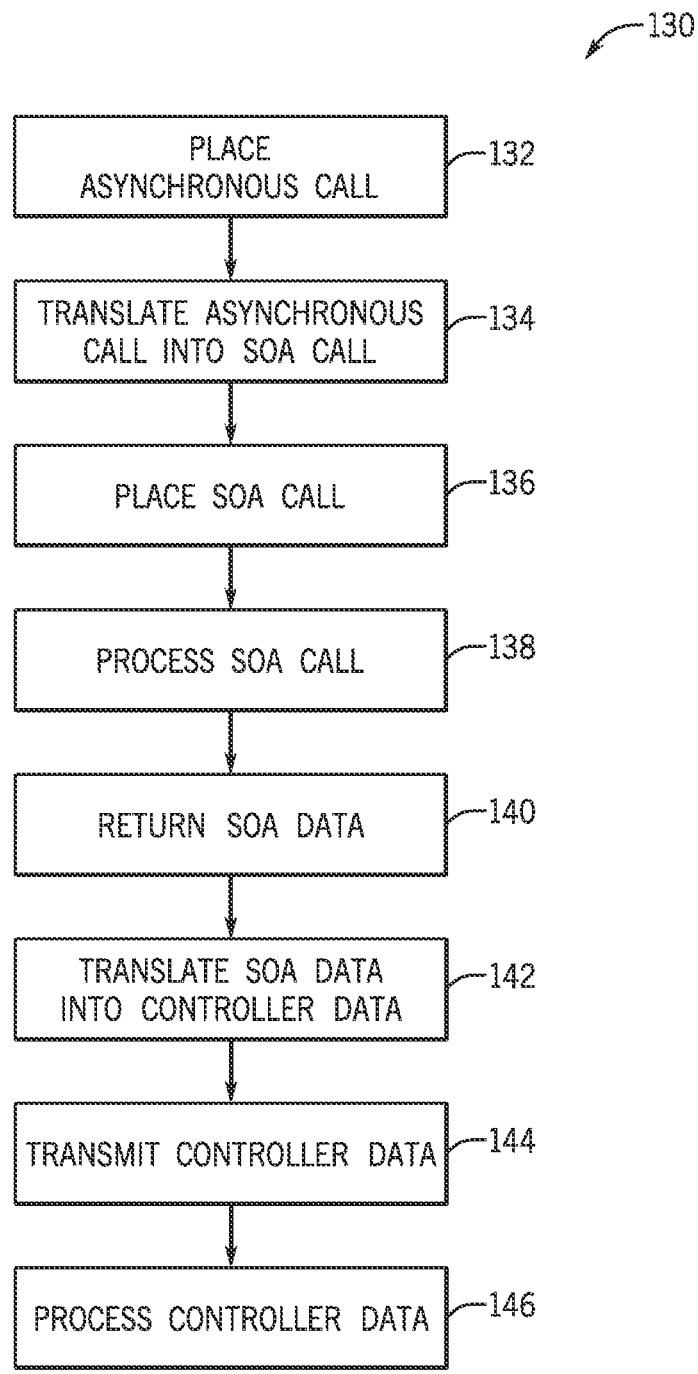
FIG. 4 is a flow chart depicting an embodiment of a process for communicating SOA data between the controller of FIG. 1 and external systems.

FIG. 4 is a flow chart illustrating an embodiment of a process 130 suitable for enabling the controller 38 in communication with SOA-based systems, including systems that may use web services. The process 130 may be implemented by using computer instructions or code stored, for example, in the memory 41 of the controller 38 and executed by the processor 39. In the depicted embodiment, the process 130 may place an asynchronous call (block 132). The asynchronous call may include a call to interface with a web service, such as services 116, 118, 120, 122. The asynchronous call may be placed (block 132), for example, by a function block or function blocks, or by any other executable code included in the controller 38. The process 132 may then translate the asynchronous call into a SOA call (block 134). As described above, the processes 106, 108, 110 may be used to provide for SOA interfacing, and thus may translate data and associated information from the asynchronous call into data and information suitable for use in the web services 116, 118, 120, 122.

The process 130 may then place the SOA call (block 136). For example, the generic service process 106, the custom service A process 108, and/or the custom service B process 110 may interface with desired web services 116, 118, 120, 122 to request and/or provide data. The web services 116, 118, 120, 122 may then process the SOA call (block 138) and return SOA data (block 140). As mentioned above, the SOA data may include both native data types (e.g., integer, string, array, float) and custom data types (e.g., custom classes, custom structs, custom arrays, datasets, and so on). The returned data may be received, for example, by the processes 106, 108, 110 and translated (block 142), for example, into controller data (e.g., EGD data, Modbus data, or in general, data types understood by the controller 38) that may be more easily understood by the block execution process 102. The translated data (e.g., EGD data) may then be transmitted (block 144) to the block execution process 102. The block execution process 102 may then use the data (block 146) to perform control actions, such as operating actuators, modulating valves, and so on. By providing for a PRM level 1 controller suitable for accessing and using data provided by web services, the techniques described herein may enable a more flexible and extendable control system.

Technical effects of the invention include providing for a communications interface useful in enabling a PRM level 1 controller to interact with external systems by using service oriented architecture (SOA)-based mechanisms, including but not limited to web services. Generic service processes are provided, suitable for interfacing with web services that use standard data structures (e.g., native data structures). Custom service processes are provided, useful in interfacing with web services that use custom data structures.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
an industrial controller comprising a first processor configured to:
execute a substantially deterministic control process; and
communicate with a second processor included in a communications interface system and communicatively coupled to the first processor, wherein the first processor is configured to communicate an asynchronous data to the second processor via an industrial communications protocol during the execution of the control process, and the second processor is configured to retrieve external data from an external system based on an asynchronous signal, and to communicate the external data to a control system via an Ethernet-based communications protocol, wherein the processor provides for a Purdue Reference Model (PRM) level 1 controller.

2. The system of claim 1, wherein the second processor is configured to:
translate the asynchronous data into a service oriented architecture (SOA) communication and wherein the external data comprises a SOA data.

3. The system of claim 1, wherein the industrial control communication protocol comprises an Ethernet Global Data (EGD) automation protocol configured to use a snapshot of a memory communicatively coupled to the second processor to communicate between the industrial controller and the second processor, a Modbus protocol, or a combination thereof.

4. The system of claim 3, wherein the EGD automation protocol comprises a produced exchange EGD data structure, and wherein the asynchronous data includes the produced exchange EGD data structure.

5. The system of claim 1, wherein the Ethernet-based communications protocol comprises an open connectivity via open standards (OPC) protocol configured to provide for a loose communications coupling between the second processor and the external system.

6. The system of claim 1, wherein the first processor is configured to set a parameter of the industrial controller, to reprogram the industrial controller, or a combination thereof, based on the external data.

7. The system of claim 6, wherein the parameter comprises an input/output (I/O) configuration, a memory configuration, a networking configuration, or a combination thereof.

8. The system of claim 1, wherein the first processor is configured to execute a function block program via a block execution process, and wherein the external data is processed by the function block program.

9. The system of claim 1, wherein the first processor is configured to execute a generic service process, a custom service process, or a combination thereof, and wherein the generic service process is configured to transform native data types included in the external data into industrial controller data types, and wherein the custom service process is configured to transform custom data types included in the external data into the industrial controller data types.

10. A method comprising:
placing an asynchronous call by using an industrial controller;
translating the asynchronous call into a service oriented architecture (SOA) call;
placing the SOA call;
processing the SOA call by using a SOA interface;
deriving data based on processing the SOA call; and
transmitting the data to the industrial controller, wherein the industrial controller is configured to execute a substantially deterministic control process protocol, wherein the industrial controller comprises a Purdue Reference Model (PRM) level 1 controller.

11. The method of claim 10, wherein transmitting the data comprises using an asynchronous Ethernet Global Data (EGD) exchange data structure configured to use a shared memory.

12. The method of claim 10, wherein deriving the data comprises using a weather system, a business logic system, a maintenance system or a combination thereof, to process the SOA call.

13. The method of claim 10, comprising executing a function block program to derive a process action and executing the process action based on the data.

14. A non-transitory computer-readable medium storing instructions executable by a processor and configured to:
place an asynchronous call by using an industrial controller;
translate the asynchronous call into a service oriented architecture (SOA) call;
place the SOA call;
process the SOA call by using a SOA interface;
derive data based on processing the SOA call; and
transmit the data to the industrial controller, wherein the industrial controller is configured to execute a substantially deterministic control process, wherein the industrial controller comprises a Purdue Reference Model (PRM) level 1 controller.

15. The non-transitory computer-readable medium of claim 14, wherein the code configured to transmit the data comprises code configured to communicate via an Ethernet Global Data (EGD) protocol, a Modbus protocol, or a combination thereof.

16. The non-transitory computer-readable medium of claim 14, comprising code configured process the data by using a international electrotechnical commission (IEC) 61131-3 function block execution engine, a sequential function chart (SFC) engine, an instruction list engine, or a combination thereof.

17. The non-transitory computer-readable medium of claim 14, comprising code configured to receive the data and to set a parameter of the industrial controller, to reprogram the industrial controller, or a combination thereof, based on the data.

\* \* \* \* \*